United States Patent [19]

Baskin

[11] 4,188,171

[45] Feb. 12, 1980

[54] ROTOR BLADE INTERNAL DAMPER

[75] Inventor: Joseph M. Baskin, Bala Cynwyd, Pa.

[73] Assignee: The Boeing Company, Seattle, Wash.

[21] Appl. No.: 821,070

[22] Filed: Aug. 2, 1977

[51] Int. Cl.² .............................................. B64C 27/46
[52] U.S. Cl. .................................... 416/226; 416/145;
416/229 R; 416/500
[58] Field of Search ................... 416/144, 145, 134 A,
416/239, 226, 229, 228 R-A, 238, 23, 230 A,
500, 241 A

[56] References Cited

U.S. PATENT DOCUMENTS

| | | | |
|---|---|---|---|
| 2,568,230 | 9/1951 | Gluhareff | 416/226 X |
| 2,950,766 | 8/1960 | Huber | 416/226 |
| 2,951,542 | 9/1960 | Stulen et al. | 416/144 |
| 2,961,053 | 11/1960 | Prewitt et al. | 416/226 |
| 3,168,144 | 2/1965 | Capowich et al. | 416/226 |
| 3,217,807 | 11/1965 | Underhill et al. | 416/226 |
| 3,484,174 | 12/1969 | McCoubrey | 416/229 X |
| 3,586,460 | 6/1971 | Toner | 416/230 A X |
| 3,603,701 | 9/1971 | Tarczynski | 416/230 X |
| 3,645,481 | 2/1972 | Purdy | 416/23 X |
| 3,782,856 | 1/1974 | Salkind et al. | 416/228 A X |

*Primary Examiner*—Everette A. Powell, Jr.
*Attorney, Agent, or Firm*—Felix J. D'Ambrosio; Edwin E. Greigg; Jack D. Puffer

[57] ABSTRACT

A load absorbing elastic member or members is incorporated in the design of a rotor blade to assist in reducing flapwise and chordwise bending moments, torsional loading, and to reduce or eliminate the control system loads induced by rotor blade moment stall. In all its embodiments, the load absorbing elastic member has operatively associated therewith a constraining member which serves as a strain amplifier permitting the load absorbing elastic member to achieve its purpose effectively.

23 Claims, 6 Drawing Figures

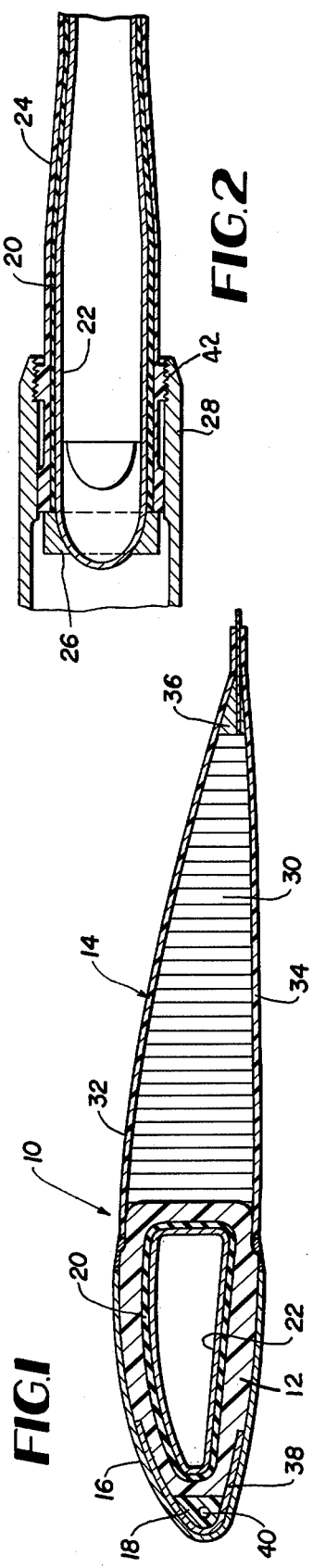
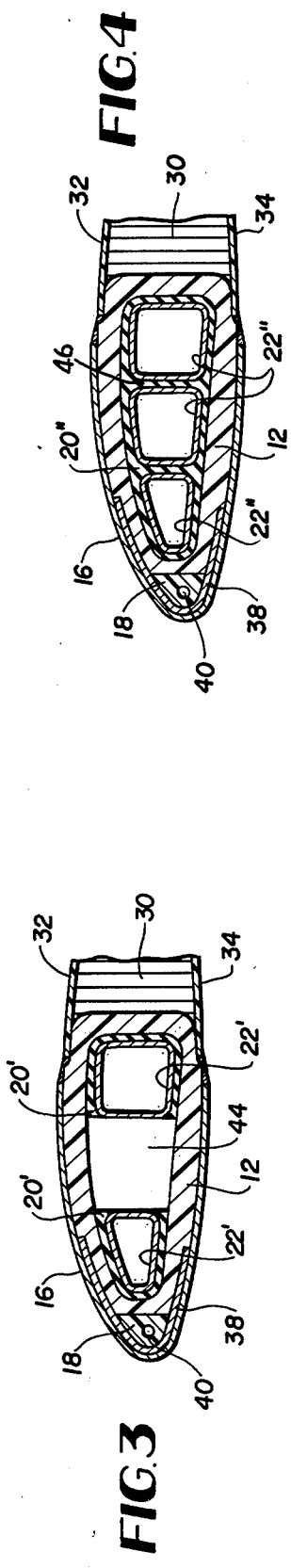

ROTOR BLADE INTERNAL DAMPER

CROSS REFERENCE TO RELATED APPLICATIONS

This application discloses subject matter disclosed and claimed in application Ser. No. 718,543 filed Aug. 30, 1976, entitled "COMPOSITE AERODYNAMIC ROTOR BLADE ASSEMBLY"; and application Ser. No. 718,796 filed Aug. 30, 1976, entitled "METHOD OF FABRICATING A COMPOSITE AERODYNAMIC ROTOR BLADE ASSEMBLY". All three applications have a common assignee.

BACKGROUND OF THE INVENTION

This invention relates to rotor blades, and in particular to a load absorbing member or members incorporated in the design of the rotor blades which assist in reducing both flapwise and chordwise bending moments, torsional loading and reduce or eliminate the control system loads induced by rotor blade moment stall.

In a general sense, the designer of helicopter rotor blades always strives to maintain the loading on the rotor blades within acceptable limits, while at the same time avoiding unnecessarily burdening a design with added weight. The trend has been toward the "new" materials including the nonmetallic materials such as fiberglass. The loading on a given rotor blade design, however, is not necessarily reduced by the use of a different material. Instead, the rotor blade may be better able to withstand the loading, or it may redistribute the loading. To reduce the loading is a problem unique in itself and one that is not always readily solvable.

Consider for example the aerodynamic phenomenon associated with helicopter rotor blades known as rotor blade moment stall. Generally this phenomenon is understood to occur at a critical blade angle of attack, where there is an aft movement of the aerodynamic center and it has a nonlinear motion with oscillatory angle of attack changes. As the forward speed of the helicopter increases, the angle of attack of the retreating blade increases in a cyclic fashion until the critical angle of attack is reached with the noted moment stall regime. One of the effects produced by this moment stall, and one which grows in severity as the rotor blade penetrates the moment stall regime, is a rapid growth in control system loads. This rapid growth of the control system loads severely limits the forward speed capability of the aircraft.

It would therefore be desirable to develop means for eliminating or at least decreasing the control system load growth, rather than increasing the size of the control system components or limiting the forward flight speed. Quite obviously increasing the size of the control system is undesirable because of the resulting weight penalty and associated problems. It would be most desirable, accordingly, to develop means for eliminating or at least decreasing the control system load growth while retaining present control system designs.

OBJECTS AND SUMMARY OF THE INVENTION

It is, therefore, an object of the present invention to provide the existing state-of-the-art with means for eliminating or at least decreasing the control system load growth to an acceptable level.

It is another object of the present invention to provide the existing state-of-the-art with means for achieving the first stated object while retaining present control system designs.

It is related object of the present invention to provide means within the rotor blade structure for absorbing rotor blade chordwise and flapwise bending loads and torsional loads.

These objects and others, which will become apparent from a consideration of the disclosure, are achieved by incorporating at least one load absorbing member in the rotor blade design along with an associated constraining member which cooperates with the load absorbing member and imparts a degree of constraint to the load absorbing member thus enabling the load absorbing member to become distorted or "activated".

BRIEF DESCRIPTION OF THE DRAWINGS

FIG. 1 is a cross sectional view of a composite rotor blade which embodies the advance represented by the present invention.

FIG. 2 is a schematic view illustrating the rotor hub connection of the inventive means.

FIG. 3 is a partial cross sectional view of a composite rotor blade illustrating an alternate embodiment of the advance presented by the present invention.

FIG. 4 is a partial cross sectional view of a composite rotor blade illustrating another embodiment of the advance represented by the present invention.

FIG. 5 is a partial cross sectional view of the trailing edge according to one embodiment of the invention.

FIG. 6 is a partial cross sectional view of the trailing edge according to another embodiment of the invention.

DESCRIPTION OF THE PREFERRED EMBODIMENTS

INTRODUCTION

The description of the preferred embodiment that follows is based on a composite rotor blade recently developed by the assignee of the present application, one version of which is described in detail in the above cited cross referenced applications. It should be noted, however, that the present invention can be utilized just as effectively in other types of rotor blades, such as metal blades or even wood blades. These blades, like the composite blade, are also subject to moment stall and also therefore benefit by the present invention.

DETAILED DESCRIPTION

Turning now to a more specific description of this invention, attention is directed first to FIG. 1 which illustrates details of a composite blade 10 which incorporates features according to the present invention.

The composite blade 10 includes in its essential parts a spar 12, an aft fairing structure 14, a cap member 16, a nose block 18, a load absorbing member 20, and a constraining member 22.

The spar 12 is formed generally as a rounded "D" shaped structure in cross-section with a spanwise transition to a generally rectangular root end section 24 (FIG. 2). The spar 12 is tubular and acts as the predominate load bearing member of the blade and therefore serves as a carrier to which all other elements are attached to form the composite structure. Because the spar serves as a carrier, its outer surface is shaped to accommodate the other elements of the blade so that in cross section, the blade presents an airfoil shape.

The aft fairing structure 14 includes typically a lightweight core 30, made preferably of foam or honeycomb, an upper skin member 32, a lower skin member 34 and in most cases, a trailing edge wedge 36.

Preferably each of the elements comprising the aft fairing structure possesses a unitary spanwise construction. Alternatively, the elements may comprise any number of discrete boxes each including a core, upper and lower skin members and, in most cases, a trailing edge wedge. In assembly, the boxes are separated by a spacer rib (not shown).

The spar 12 is shown with an integral heel portion. However, the spar heel portion could be fabricated separately from the remainder of the spar 12 and assembled first with the aft fairing structure 14. For details of this feature reference should be made to the above-identified applications.

At the front end of the blade assembly there is preferably provided in addition to the cap member 16 and the nose block 18 a deicing blanket 38. The nose block 18 may have formed therein a spanwise extending threaded bore 40 to which a dynamic balance weight (not shown) is attached at the blade tip.

The cap member 16 is preferably made of metal, such as titanium, although it may be made of any non-metallic material capable of protection against erosion. Whether the cap member 16 is made of metal or of a non-metallic material, it includes a non-metallic inboard portion which with the spar 12, the load absorbing member 20 and the constraining member 22 form the root end of the blade.

Preferably a continuous wall is established between the outside surface of the cap member 16 and the aft fairing skin members 32 and 34, as shown in FIGS. 1, 3 and 4.

A significant feature of this invention resides in the inclusion of at least one load absorbing member 20 and associated constraining member 22 (single-cell configuration) within the spar 12, (FIG. 1). Alternatively, a double-cell configuration (FIG. 3) or a triple-cell configuration (FIG. 4) could be utilized. Other numerical configurations are also possible within the contemplation of the present invention.

In one embodiment for all the configurations, the load absorbing member and constraining member extend, preferably, substantially the full spanwise length of the blade 10. This is in the preferred configuration for effectively reducing the loading due to blade moment stall. However, it is also within the contemplation of this invention to have a plurality of load absorbing members and associated constraining members situated spanwise of the spar member. This can be provided in either the single cell, double cell or triple cell configuration, or any other numerical configuration. In addition, when viewed spanwise, the individual assemblies of load absorbing members and associated constraining members may be equally spaced or unequally spaced. The actual spacing depends upon the blade loading being considered, and is determined either analytically or by wind tunnel testing.

At the blade root end shown in FIG. 2, the constraining member or members 22 wrap around a respective plug fitting 26 (shown in cross-section in FIG. 2). The plug fitting 26 engages the end of the spar 12. Note the spar 12 is provided with threads 42 for engaging the rotor hub 28. Thus, if a separation of the absorbing member 20 from the spar 12 occurs, the centrifugal force produced by the constraining member is transferred to the rotor hub 28 by the plug fitting 26 through the threads 42.

Again in all configurations, as shown in the exemplary embodiments of FIGS. 1, 3 & 4, the assembled constraining member or members and the load absorbing member conform to the internal volume defined by the spar member so that the spanwise progression of the assembly is generally "D" shaped to generally rectangular shaped, as is the spar member. For example, in the embodiment illustrated in FIG. 3, the constraining member 22' closest to the aft fairing structure 14 is generally rectangularly shaped throughout its length, whereas the constraining member 22' closest to the nose block 18 experiences a transition from the shape shown to the generally rectangular shape at the root end.

The method of fabricating the composite blade can be understood by reference to the above-identified applications. In conjunction with the method as discussed in these applications, the load absorbing member and constraining member combination of all embodiments can be fabricated with the spar subassembly during its fabrication or separately and joined to the spar after the fabrication of the blade 10. The constraining member 22, 22' and 22" can be metal or a filament wound fiber material, and the load absorbing member 20 is preferably a visco-elastic material such as a polysulfide elastomer having the following qualities: high damping capacity; good bonding quality to metals and glass reinforced plastics; retention of elastic properties to a reasonable degree at very low temperatures; a loss factor which is frequency sensitive (damping increases as a function of frequency); and a loss which is a function of shear strain.

When fabricating the load absorbing member and constraining member combination with the spar subassembly (either as a separate subassembly, or with all the blade subassemblies in a single matched die mold), one basic procedure would be as follows:

(A) The single-cell configuration of FIG. 1.

Preferably the constraining member 22 is made of a Graphite or glass fiber filament would material. With such a material, the constraining member 22 is layed-up on an inflatable bag mandrel. The load absorbing member 20 having previously been formed in a separate mold is then slipped over the layed-up constraining member. Alternatively, the load absorbing member 20 can also be layed-up over the layed-up constraining member if the visco-elastic material of which the load absorbing member is made is obtainable in strip form as is the filament wound material. In either case, the spar 12, which is made of a glass fiber material, is then layed-up on the previously assembled members 20 and 22. The three assembled layers are then subjected to a curing cycle using heat and pressure to form all three layers, or in the case where the load absorbing member is previously formed, to form the constraining member and the spar into structural members. In the process of curing, the three members are also mutually adhered into a structural unit. If desired room temperature curing adhesives can be applied to the interfaces of the load absorbing member and the spar, as well as those between the load absorbing member and the constraining layer to effect a secure bond between these members during the curing cycle.

The constraining member 22 can also be made of metal. In this case, the inflatable bag mandrel can be dispensed with, and the metal constraining member can also serve as the mandrel. However, it is necessary for the metal constraining member to have at least one longitudinal slit so that it can expand under pressure during the curing cycle. Here too, the load absorbing member can be preformed or layed-up as is the spar. Also, a suitable adhesive can be used between the load absorbing member and the spar interface if the spar, the absorbing member and the constraining layer are assembled at room temperature.

(B) The double-cell configuration of FIG. 3.

Each cell is formed as above on a separate mandrel (glass fiber filament wound constraining member), or with the constraining member as a mandrel (metal constraining member). Between the two cells thus prepared, there is situated in inflatable bag mandrel in the space 44, and over the two cells and inflatable bag mandrel, the spar is layed-up. To this assembly, which rests in a mold, heat and pressure are applied as part of a curing cycle.

(C) The triple-cell configuration of FIG. 4.

Each cell is formed as is the single-cell configuration, but with each cell using a separate mandrel (glass fiber filament wound constraining member) or using the constraining member as a mandrel (metal constraining member). The spar is then layed-up over the three cells and heat and pressure applied to the assembly, which rests in a mold as part of a curing cycle. In this configuration, the portions (ribs) 46 of the load absorbing member 20'' are inserted between the cells separately before the remainder of the load absorbing member (the outer portion of the load absorbing member) and before the curing cycle is commenced.

In all configurations, the provision of a constraining member (22, 22', 22'') acts as a "strain amplifier" permitting the load absorbing member (20, 20', 20'') to be distorted longitudinally, transversely and torsionally, thereby effectively reacting a part of the flapwise bending loads, chordwise bending loads and torsional loads induced on the blade due to various flight conditions encountered. The load absorbing member can be distorted more readily than the constraining member because of the relative stiffness property of the two members.

As noted above, in all configurations, the root end of the constraining member is formed around a plug which engages the blade spar. The reason for this design is so that a general failure of the load absorbing member(s) will not create a dangerous situation for the helicopter, since the centrifugal force acting on the constraining member(s) will be reacted by the rotor hub pin (not shown) thereby permitting the blade to retain its structural integrity until corrective action can be taken.

The above configurations of the load absorbing member and constraining member, i.e., those configurations in which these members are placed in assembly with the spar, comprise the primary configurations of the invention. In addition to the primary configurations, one of two secondary configurations is possible. These are shown in FIGS. 5 and 6. The secondary configurations illustrated in FIGS. 5 and 6 can be employed in combination with any one of the primary configurations of FIGS. 1 3 and 4, or they can be employed alone.

In each configuration there is provided a trailing edge strip 48 (unidirectional glass or graphite, or steel strip) secured in the trailing edge wedge 36 by a visco-elastic material. In FIG. 5, the trailing edge strip 48 serves as the constraining member, while the visco-elastic material serves as the load absorbing member, noted in this configuration by the reference numberal 20'''. In FIG. 6, the outwardly extending portion of the trailing edge strip 48 has its top and bottom surfaces covered with a load absorbing member 20''' and a constraining member 50. Note that these load absorbing members and constraining members are separated from the aft fairing structure skins 32 and 34 and adhere only to the trailing edge strip.

These secondary configurations serve as do the primary configurations to absorb flapwise and chordwise bending loads, and when used with any primary configuration they serve to enhance the performance of the primary configurations.

These secondary configurations can be fabricated with fabrication of the aft fairing structure 14, and in the embodiment of FIG. 6, it can also be fabricated separately. Generally, however, the fabrication is completed simultaneously. For example, in the embodiment of FIG. 5, the lower portion of the trailing edge wedge 36 is first layed-up on the bottom skin 34. Then a layer of visco-elastic material is either layed-up or placed on the layed-up lower portion of the trailing edge wedge 36. Next, the trailing edge strip is placed in position and the upper layers of the visco-elastic material and the trailing edge wedge are layed-up, or in the case of the visco-elastic material simply placed in position. Finally, the upper skin 32 is layed-up onto the assembled elements and the core 30 and the assembly subjected to the heat and pressure of a curing cycle.

Preferably, the load absorbing members and associated constraining members of the secondary configurations extend the full spanwise length of the aft fairing structure. However, a plurality of equally spaced or unequally spaced assemblies of load absorbing members and associated constraining members are contemplated by the invention. Here again the spacing depends on the loading being considered and is determined analytically and/or by testing.

Finally, it should be noted that room temperature curing elastomers may also be used for the load absorbing members. These are preferably used, however with blades other than the composite blade described in the noted copending applications.

What is claimed is:

1. An aerodynamic rotor blade comprising:
(a) an elongated structural spar member having an inner surface forming a hollow interior throughout its length and a contoured outer surface forming a leading edge portion and a spar heel portion which together define the chordwise limits of the spar member, and a tip end portion and a root end portion, which together define the spanwise limits of the spar member;
(b) an aft fairing structure attached to the spar member at the spar heel portion;
(c) at least one constraining member situated within the hollow interior of the spar member, each including a top, bottom and at least one side wall connected to the top and bottom walls; and
(d) as associated load absorbing elastic member for each constraining member, each having a stiffness less than that of the spar member and its associated constraining member, each being at least spanwise coextensive with its associated constraining member, and each being situated within the hollow interior of the spar member between the inner surface of the spar member and the outer surface of its associated constraining member, as defined by its top, bottom and at least one side wall, and being attached to said outer surface of its associated constraining member and to the inner surface of the spar member.

2. The aerodynamic rotor blade as defined in claim 1, wherein the outer surface defined by the top and bottom walls of each constraining member substantially conforms, chordwise, to the shape of the inner surface of the spar member adjacent to the respective top and bottom walls, as a result of which the shape of the load absorbing elastic member associated with the top and bottom walls of each constraining member also substantially conforms, chordwise, to the shape of the inner surface of the spar member adjacent to the respective top and bottom walls.

3. The aerodynamic rotor blade as defined in claim 2, further comprising:
 (e) a plug fitting connected to the constraining member adjacent to the root end portion of the spar member, said plug fitting being disposed to engage the root end portion of the spar member under the influence of centrifugal force and when the attachment of the load absorbing elastic member associated with said adjacent constraining member to the inner surface of the spar member is removed.

4. The aerodynamic rotor blade as defined in claim 1, wherein a single elongated constraining member and associated load absorbing elastic member are situated within the hollow interior of the spar member, both members extending, spanwise, substantially the full length of the spar member.

5. The aerodynamic rotor blade as defined in claim 4, further comprising:
 (e) a plug fitting connected to the constraining member at the root end portion of the spar member, said plug fitting being disposed to engage the root end portion of the spar member under the influence of centrifugal force and when the attachment of the associated load absorbing elastic member to the inner surface of the spar member is removed.

6. An aerodynamic rotor blade comprising:
 (a) an elongated structural spar member having an inner surface forming a hollow interior throughout its length and a contoured outer surface forming a leading edge portion and a spar heel portion, which together define the chordwise limits of the spar member, and a tip end portion and a root end portion, which together define the spanwise limits of the spar member;
 (b) an aft fairing structure attached to the spar member at the spar heel portion;
 (c) a plurality of constraining members situated within the hollow interior of the spar member to form at least one assembly of three constraining members arranged in parallel, such that in each assembly the constraining members have that portion of their outer surfaces which face the inner surface of the spar member together substantially conforming to the chordwise shape of the inner surface of the spar member; and
 (d) an associated load absorbing elastic member for each assembly of constraining members, each load absorbing elastic member having a stiffness less than that of the spar member and the constraining members of its associated assembly, each being spanwise coextensive with the constraining members of its associated assembly, and each being situated within the hollow interior of the spar member between the inner surface of the spar member and the constraining members of its associated assembly, as a result of which the shape of part of the load absorbing elastic member also substantially conforms to the shape of the inner surface of the spar member and the outer surfaces of the constraining members which face the inner surface of the spar member, while the remaining part of the load absorbing elastic member serves to separate the constraining members in its associated assembly from each other, wherein each load absorbing elastic member is attached to the outer surface of the constraining members of its associated assembly and to the inner surface of the spar member.

7. The aerodynamic rotor blade as defined in claim 6, further comprising:
 (e) a plug fitting connected to each constraining member of the assembly of constraining members adjacent to the root end portion of the spar member, each said plug fitting being disposed to engage the root end portion of the spar member under the influence of centrifugal force and when the attachment of the load absorbing elastic member associated with said adjacent assembly of constraining members to the inner surface of the spar member is removed.

8. The aerodynamic rotor blade as defined in claim 6, wherein a single assembly of three elongated constraining members arranged in parallel and an associated load absorbing elastic member are situated within the hollow interior of the spar member, and wherein each constraining member and the associated load absorbing elastic member extend, spanwise, substantially the full length of the spar member.

9. The aerodynamic rotor blade as defined in claim 8, further comprising:
 (e) a plug fitting connected to each of the three elongated constraining members at the root end portion of the spar member, each said plug fitting being disposed to engage the root end portion of the spar member under the influence of centrifugal force and when the attachment of the associated load absorbing elastic member to the inner surface of the spar member is removed.

10. An aerodynamic rotor blade comprising:
 (a) an elongated structural spar member having an inner surface forming a hollow interior throughout its length and a contoured outer surface forming a leading edge portion and a spar heel portion, which together define the chordwise limits of the spar member, and a tip end portion and a root end portion, which together define the spanwise limits of the spar member;
 (b) an aft fairing structure attached to the spar member at the spar heel portion;
 (c) a plurality of constraining members situated within the hollow interior of the spar member to form at least one assembly of two constraining members arranged in parallel, with one of the constraining members being situated within the hollow interior of the spar member adjacent to the leading edge portion and with the other constraining member being situated within the hollow interior of the spar member adjacent to the spar heel portion, such that in each assembly the constraining members have that portion of their outer surfaces which face the adjacent inner surface of the spar member substantially conforming to the chordwise shape of the adjacent inner surface of the spar member;

(d) an associated load absorbing elastic member for each assembly of constraining members, each load absorbing elastic member having a stiffness less than that of the spar member and the constraining members of its associated assembly, each being spanwise coextensive with the constraining members of its associated assembly, and each being situated within the hollow interior of the spar member between the inner surface of the spar member and the constraining members of its associated assembly, as a result of which the shape of each load absorbing elastic member also substantially conforms to the shape of the adjacent inner surface of the spar member and that portion of the outer surface of its associated constraining member that faces the adjacent inner surface of the spar member, wherein each load absorbing elastic member is attached to the outer surface of its associated constraining member and to the adjacent inner surface of the spar member.

11. The aerodynamic rotor blade as defined in claim 10, further comprising:
(e) a plug fitting connected to each constraining member of the assembly of constraining members adjacent to the root end portion of the spar member, each said plug fitting being disposed to engage the root end portion of the spar member under the influence of centrifugal force and when the attachment of the associated load absorbing elastic member to the inner surface of the spar member is removed.

12. The aerodynamic rotor blade as defined in claim 10, wherein a single assembly of two elongated constraining members arranged in parallel and associated load absorbing elastic members are situated within the hollow interior of the spar member, and wherein each constraining member and its associated load absorbing elastic member extend, spanwise, substantially the full length of the spar member.

13. The aerodynamic rotor blade as defined in claim 12, further comprising:
(e) a plug fitting connected to each of the two elongated constraining members at the root end portion of the spar member, each said plug fitting being disposed to engage the root end portion of the spar member under the influence of centrifugal force and when the attachment of the associated load absorbing elastic member to the inner surface of the spar member is removed.

14. An aerodynamic rotor blade comprising:
(a) an elongated structural spar member having an inner surface forming a hollow interior throughout its length and a contoured outer surface forming a leading edge portion and a spar heel portion which together define the chordwise limits of the spar member, and a tip end portion and a root end portion, which together define the spanwise limits of the spar member;
(b) an aft fairing structure attached to the spar member at the spar heel portion along the full length thereof, said aft fairing structure having a trailing edge wedge at its end remote from its attachment to the spar heel portion;
(c) at least one constraining member situated within the hollow interior of the spar member, each including a top, bottom and at least one side wall connected to the top and bottom walls;
(d) an associated load absorbing elastic member for each constraining member, each having a stiffness less than that of the spar member and its associated constraining member, each being at least spanwise coextensive with its associated constraining member, and each being situated within the hollow interior of the spar member between the inner surface of the spar member and the outer surface of its associated constraining member, as defined by its top, bottom and at least one side wall, and being attached to said outer surface of its associated constraining member and to the inner surface of the spar member;
(e) at least one further constraining member situated within the trailing edge wedge, having substantially parallel surfaces facing the trailing edge wedge; and
(f) two further load absorbing elastic members associated with each further constraining member, each further load absorbing elastic member having a stiffness less than that of its associated constraining member and the trailing edge wedge, the further load absorbing elastic member being attached to their associated further constraining members along a respective one of its parallel surfaces and to the facing trailing edge wedge.

15. The aerodynamic rotor blade as defined in claim 14, wherein the outer surface defined by the top and bottom walls of each constraining member within the spar member substantially conforms chordwise, to the shape of the inner surface of the spar member adjacent to the respective top and bottom walls, as a result of which the shape of the load absorbing elastic member associated with the top and bottom walls of each constraining member within the spar member also substantially conforms, chordwise, to the shape of the inner surface of the spar member adjacent to the respective top and bottom walls.

16. The aerodynamic rotor blade as defined in claim 15, further comprising:
(g) a plug fitting connected to the constraining member in the spar member adjacent to the root end portion of the spar member, said plug fitting being disposed to engage the root end portion of the spar member under the influence of centrifugal force and when the attachment of the load absorbing elastic member associated with said adjacent constraining member to the inner surface of the spar member is removed.

17. The aerodynamic rotor blade as defined in claim 14, wherein a single elongated constraining member and associated load absorbing elastic member are situated within the hollow interior of the spar member, both members extending, spanwise, substantially the full length of the spar member.

18. The aerodynamic rotor blade as defined in claim 17, further comprising:
(g) a plug fitting connected to the single constraining member at the root end portion of the spar member, said plug fitting being disposed to engage the root end portion of the spar member under the influence of centrifugal force and when the attachment of the associated load absorbing elastic member to the inner surface of the spar member is removed.

19. An aerodynamic rotor blade comprising:

(a) an elongated structural spar member having an inner surface forming a hollow interior throughout its length and a contoured outer surface forming a leading edge portion and a spar heel portion which together define the chordwise limits of the spar member, and a tip end portion and a root end portion, which together define the spanwise limits of the spar member;

(b) an aft fairing structure attached to the spar member at the spar heel portion along the full length thereof, said aft fairing structure having a trailing edge wedge at its end remote from its attachment to the spar heel portion, which includes a trailing edge strip embedded therein and extending outwardly therefrom beyond the aft fairing structure, said trailing edge strip having substantially parallel surfaces at its extension beyond the aft fairing structure;

(c) at least one constraining member situated within the hollow interior of the spar member, each including a top, bottom and at least one side wall connected to the top and bottom walls;

(d) an associated load absorbing elastic member for each constraining member, each having a stiffness less than that of the spar member and its associated constraining member, each being at least spanwise coextensive with its associated constraining member, and each being situated within the hollow interior of the spar member between the inner surface of the spar member and the outer surface of its associated constraining member, as defined by its top, bottom and at least one side wall, and being attached to said outer surface of its associated constraining member and to the inner surface of the spar member;

(e) at least two further constraining members; and (f) a further load absorbing elastic member associated with each further constraining member, each further load absorbing elastic member having a stiffness less than that of its associated further constraining member and the trailing edge strip, the further load absorbing elastic members being attached to their associated further constraining member and to a respective one of the parallel surfaces of the trailing edge strip.

20. The aerodynamic rotor blade as defined in claim 19, wherein the outer surface defined by the top and bottom walls of each constraining member within the spar member substantially conforms, chordwise, to the shape of the inner surface of the spar member adjacent to the respective top and bottom walls, as a result of which the shape of the load absorbing elastic member associated with the top and bottom walls of each constraining member within the spar member also substantially conforms, chordwise, to the shape of the inner surface of the spar member adjacent to the respective top and bottom walls.

21. The aerodynamic rotor blade as defined in claim 20, further comprising:

(g) a plug fitting connected to the constraining member adjacent to the root end portion of the spar member, said plug fitting being disposed to engage the root end portion of the spar member under the influence of centrifugal force and when the attachment of the load absorbing elastic member associated with said adjacent constraining member to the inner surface of the spar member is removed.

22. The aerodynamic rotor blade as defined in claim 19, wherein a single elongated constraining member and associated load absorbing elastic member are situated within the hollow interior of the spar member, both members extending, spanwise, substantially the full length of the spar member.

23. The aerodynamic rotor blade as defined in claim 22, further comprising:

(g) a plug fitting connected to the constraining member at the root end portion of the spar member, said plug fitting being disposed to engage the root end portion of the spar member under the influence of centrifugal force and when the attachment of the associated load absorbing elastic member to the inner surface of the spar member is removed.

* * * * *